United States Patent
Despreaux (10) Patent No.: US 6,546,829 B1
(45) Date of Patent: Apr. 15, 2003

(54) MARINE STEERING WHEEL ASSEMBLY (76) Inventor: A. Michel Despreaux, 2761 NE. 47 St., Lighthouse Point, FL (US) 33064

( * ) Notice: Subject to any disclaimer, the term of this patent is extended or adjusted under 35 U.S.C. 154(b) by 0 days.

(21) Appl. No.: 09/749,246

(22) Filed: Dec. 27, 2000

Related U.S. Application Data (60) Provisional application No. 60/173,319, filed on Dec. 28, 1999.

(51) Int. Cl.[7] .................................................. B62D 1/04
(52) U.S. Cl. .......................................... 74/558; 74/552
(58) Field of Search ........................ 74/552, 558, 558.5

(56) References Cited

U.S. PATENT DOCUMENTS

| | | | | |
|---|---|---|---|---|
| 574,755 A | * | 1/1897 | Oehler | 16/443 |
| 1,391,108 A | | 9/1921 | Hamblet | |
| 1,978,105 A | * | 10/1934 | Flanagan | 74/558 |
| 1,984,033 A | | 12/1934 | Ritchie | |
| 3,276,152 A | | 10/1966 | Tsuneizumi | |
| 3,468,188 A | * | 9/1969 | MacCoon | 74/552 |
| 4,945,786 A | * | 8/1990 | Goto | 74/552 |
| 4,976,801 A | | 12/1990 | Martine et al. | |
| 5,213,007 A | | 5/1993 | Yoo | |
| 5,224,397 A | | 7/1993 | Yoo | |
| 6,038,770 A | * | 3/2000 | Carrier | 29/894.1 |

FOREIGN PATENT DOCUMENTS

| | | | | |
|---|---|---|---|---|
| JP | 60-151174 | * | 8/1985 | B62D/1/06 |
| JP | 62-71755 | * | 4/1987 | B62D/1/06 |

* cited by examiner

Primary Examiner—David A. Bucci
Assistant Examiner—Timothy McAnulty
(74) Attorney, Agent, or Firm—Malloy & Malloy P.A.

(57) ABSTRACT

A steering wheel assembly for use on marine craft or other vehicles including a support frame having a preferably annular configuration, and further including at least one wheel section. Each wheel section comprises two segments connected to one another and the support frame. Each of the two segments of each wheel section are independently formed to include anyone of a plurality of predetermined, decorative surface finishes and are secured to the support frame subsequent to the surface finishing thereof. At least one gripping portion may also be provided on the support frame which is structured to facilitate the gripping thereof by the hands of an operator of the vehicle.

22 Claims, 4 Drawing Sheets

MARINE STEERING WHEEL ASSEMBLY

CLAIM OF PRIORITY

The present application is based on and a claim to priority is made under 35 U.S.C. Section 119(e) to provisional patent application currently pending in the U.S. Patent and Trademark Office having Ser. No. 60/173,319 and a filing date of Dec. 28, 1999.

BACKGROUND OF THE INVENTION

1. Field of the Invention

This invention relates to a steering wheel assembly which is particularly suited for use on a variety of marine craft, but which is also structurally adaptable for use on any of a variety of different vehicles, including motorized vehicles such as automobiles, trucks, etc. The steering wheel assembly includes at least one, but preferably, two wheel sections. Each wheel section preferably comprises two segments which are manufactured, formed and surface-finished prior to assembly with the other components of the steering wheel assembly. The independent manufacture and formation of the wheel sections prior to assembly allows for increased versatility in the structural design and aesthetic appearance of the steering wheel assembly, so as to be capable of fulfilling customized requests in an economically feasible manner.

2. Description of the Related Art

The structure and design of conventional steering wheels vary greatly depending, at least in part, on the type of vehicle on which they are used. In motorized vehicles, such as automobiles, trucks, etc., certain operative and structural requirements must be met. For example, steering wheel structures for automobiles and like motorized vehicles should be relatively compact and lightweight for efficient operation when connected to a steering column for the vehicle. However, the lightness or small mass of conventional automobile type steering wheels must overcome certain inherent problems such as vibrations when the vehicle is traveling over rough terrain or at high speeds. In addition, for reasons of safety the steering wheel must be capable of supporting relatively large forces or stresses which may be created in the event of a violent shock such as during an impact or the like resulting from an accident. Safety factors, particularly in motorized vehicles are also a major concern to the extent that some steering wheels and associated steering columns must be effectively collapsible so as to eliminate, as much as possible, harm to the driver. Such operative requirements must be met by designing a structure which is economically feasible in terms of a steering wheel comprising a major and necessary component of an automobile or like vehicle.

Steering wheels of somewhat similar design and overall appearance are also commonly utilized on a variety of different boats or other marine craft. While steering wheel assemblies used on marine craft or land traveling, motorized vehicles may be similar in overall shape and appearance, the structural features in terms of meeting certain operative standards may differ. One feature common to steering wheels used both for marine craft and motorized vehicles is the importance of the aesthetic appearance of the steering wheel to the extent of enhancing the overall appearance of the vehicle interior. The importance of the aesthetic appearance in terms of design configuration, material from which the steering wheel is formed and related matters is further evidenced by the increased demand for specialized steering wheels having a "customized" design or appearance. As set forth above, the customization of a steering wheel is primarily directed to its aesthetic appearance, rather than its structural and operative capabilities. Such aesthetic appearance, in turn, is related both to the materials from which the steering wheel is formed as well as, and in particular, the provision of a large variety of certain, predetermined surface finishes which greatly enhance and/or otherwise influence the aesthetic appearance of a steering wheel. Such preferred surface finishes can be accomplished using wood or other materials, such as a carbon fiber treated with a known hydro-transfer process. Similarly, a multicolored, three dimensional print process is capable of being preformed on certain parts of the steering wheel.

The use of known surface finishing techniques, may be limited in terms of applying such techniques to known or conventional steering wheel assemblies. This is due, at least in part, to the fact that the formation of conventional steering wheels typically includes the molding or permanent mounting of certain portions or components of the steering wheel directly on a support frame, as well as the wrapping or shaping of a variety of other generally non-moldable materials such as leather, plastic, fiber cloth, etc. directly on the support frame in a manner which provides not only a hopefully pleasing appearance but the proper "feel" to conventional steering wheel devices.

However, conventional or known techniques for the manufacture of steering wheel assemblies do not permit, at least partially because of economics, the customization of steering wheel assemblies in terms of having a variety of different appearances, including but not limited to, the provision of a variety of predetermined surface finishes. Some surface finishes, as set forth above, are highly desirable since they provide urethane or other moldable plastics with the rich appearance of more expensive or desirable material such as wood or the like.

Therefore, there is a need for an improved steering wheel assembly formed from a plurality of assembled components which may be independently manufactured and/or formed prior to assembly with other components of a steering wheel assembly on a support frame thereof. The independent formation and manufacture of certain ones of the components of any such steering wheel assembly would allow for the provision of much greater versatility in the availability of different surface finishes on a variety of moldable, relatively inexpensive materials such as urethane or like plastics. Known surface finishing techniques including but not limited to a hydro-transfer process and/or a multi colored three dimensional print process may be used on the various components during their formation, and specifically, prior to the assembly of such components on a support frame or prior to the assembly of such independently formed components with other parts of an improved steering wheel assembly. Independent formation and increased versatility in the aesthetic appearance of such individually manufactured components will allow the "customization" of a variety of steering wheel assemblies in a more economical manner.

SUMMARY OF THE INVENTION

The present invention is directed towards a steering wheel assembly of the type designed preferably for use on a marine craft, such as but not limited, to a high powered, relatively small boat or marine craft of the type which normally incorporates the use of one or more of a similar type steering wheels. It is emphasized, however, that with minimum structural modifications the steering wheel assembly of the present invention can be used on other vehicles, such as but not limited to, land traveling motorized vehicles including automobiles, trucks, etc.

The steering wheel assembly of the present invention comprises a support frame having a continuous, substantially annular configuration formed of a high strength yet light weight material, such as metal or the like. The support frame is attached to a spoke assembly for interconnection to the steering column of the vehicle in which the steering assembly of the present invention is to be incorporated. The exterior or exposed portion of the steering wheel, which is intended to be gripped by the operator of the vehicle, comprises at least one but preferably a plurality, of wheel sections. In a preferred embodiment to be described in greater detail hereinafter, two spaced-apart wheel sections are provided and each of these wheel sections is formed from a urethane or other moldable plastic material. The material from which the wheel sections are formed are not specifically limited to a moldable plastic but may take a variety of other preferably hard, non-flexible materials capable of having any one of a variety of predetermined exterior surface finishes applied thereto using known and/or conventional surface finishing techniques.

Other exposed, exterior portions of the steering wheel assembly according to the present invention comprise at least one, but preferably, two spaced apart and substantially opposing gripping portions. Each gripping portion is preferably formed from a relatively soft, at least partially compressible material such as leather, impregnated cloth, plastic wrap or other material capable of being molded to or tightly wrapped about correspondingly positioned lengths of the support frame. The opposing gripping portions are preferably disposed on opposite sides of the steering wheel when the steering wheel is disposed in what may be referred to as a "neutral" position. In addition, the aforementioned wheel sections may be separated from one another by the gripping portions and fixed to the support frame along what may be referred to as an upper half of the support frame and a lower half of the support frame when the wheel is disposed in the aforementioned "neutral" position. The term "neutral position" is meant to define the normal position or orientation of the steering wheel when it is not being rotated in either of two opposite directions and/or when the vehicle is intended to travel in a straight line path. Accordingly, the terms "upper and lower" are intended to be descriptive only of a general location of an upper wheel section and a lower wheel section relative to one another and to the oppositely disposed side dispositions of the gripping portions.

One of the inventive features of the present invention is the manufacture and formation of the one or more wheel sections, prior to their mounting on the support frame in an assembled disposition with the other parts or components of the steering wheel assembly of the present invention, including the side portions, spoke assembly etc. More specifically, each of the wheel sections is preferably defined by two segments. Each of the two segments are correspondingly and cooperatively configured and dimensioned so as to be attached to one another in supported engagement on the support frame so as to extend along and overlie or substantially surround a predetermined length thereof. In a preferred embodiment, to be described in greater detail hereinafter, the two segments defining one of the wheel sections include interior surfaces which, when the two segments are attached to one another, are disposed in confronting engagement with one another. Further, each of the interior surfaces are ideally cooperatively structured to accomplish what may be referred to as a "snap-fit" connection which serves to fixedly secure the two segments of each wheel section to one another in the aforementioned overlying or surrounding relation to an intended length of the support frame. Such snap-fit connection may take a variety of applicable structural configurations including, but not limited to, a preferred tongue and groove structure. The preferred tongue and groove structure is most preferably defined by at least one, but ideally, a plurality of elongated tongues integrally formed on and extending outwardly from an interior surface of one of the two segments of each wheel section. The other of the two segments of each wheel section includes a corresponding number of grooves dimensioned, disposed and integrally formed in the interior surface thereof. The groove and tongue structure is cooperatively dimensioned so as to accomplish the aforementioned "snap-fit" attachment which will serve to supportingly mount the segments, and accordingly, the wheel section which they comprise, along the intended length of the support frame. The aforementioned snap-fit attachment is intended to fixedly mount the wheel sections on the support frame in a manner which may be intended to be permanent. However, it should noted that the tongue and groove structure of each of the two segments defining each of the wheel sections could be dimensioned, configured and otherwise structured to allow separation of the two segments, if desired, without causing structural damage to either of the segments. This would allow either or both of such segments to be replaced, repaired, refinished etc. In order to accurately affix each of the segments in the intended surrounded location about the support frame, the inner portion of each of the two segments includes what may be referred to as an elongated, interiorly disposed receiving channel extending along the length of the corresponding wheel section. The receiving channel is specifically dimensioned and configured to receive the intended length of the support frame therein, such that the support frame extends outwardly from oppositely disposed open ends of the receiving channel. The open ends of the receiving channel are disposed adjacent to the ends of the wheel section of which they are apart. The length of the support frame extending outwardly from the wheel sections may then be covered by other wheel sections or by the aforementioned gripping portions as set forth above.

Therefore, it is a primary object of the present invention to provide a steering wheel assembly which is primarily but not exclusively intended for use on a marine craft and which comprises components defining the exterior of the steering wheel that are manufactured and formed so as to be capable of having any one of a variety of different aesthetic appearances including predetermined surface finishes.

Another primary object to the present invention is to provide a steering wheel assembly capable of being modified for use as a steering wheel on any one of a variety of different vehicles including marine craft, land traveling motorized vehicles, etc. which may incorporate any of a wide variety of customized or specialized aesthetic designs or appearances.

Yet another important object to the present invention is to provide a steering wheel assembly comprising one or more components which are manufactured and formed independently of other parts or components of the steering wheel and prior to assembly of such components with one another to form a completed, operative steering wheel assembly.

Still another important object to the present invention is to provide a steering wheel assembly manufactured and formed to include a plurality of varying design features which simulate or effectively duplicate the appearance of highly desired but more expensive materials while being formed economically and at a cost which enables requested customization in an economically feasible manner.

These and other objects, features and advantages of the present invention will become more clear when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
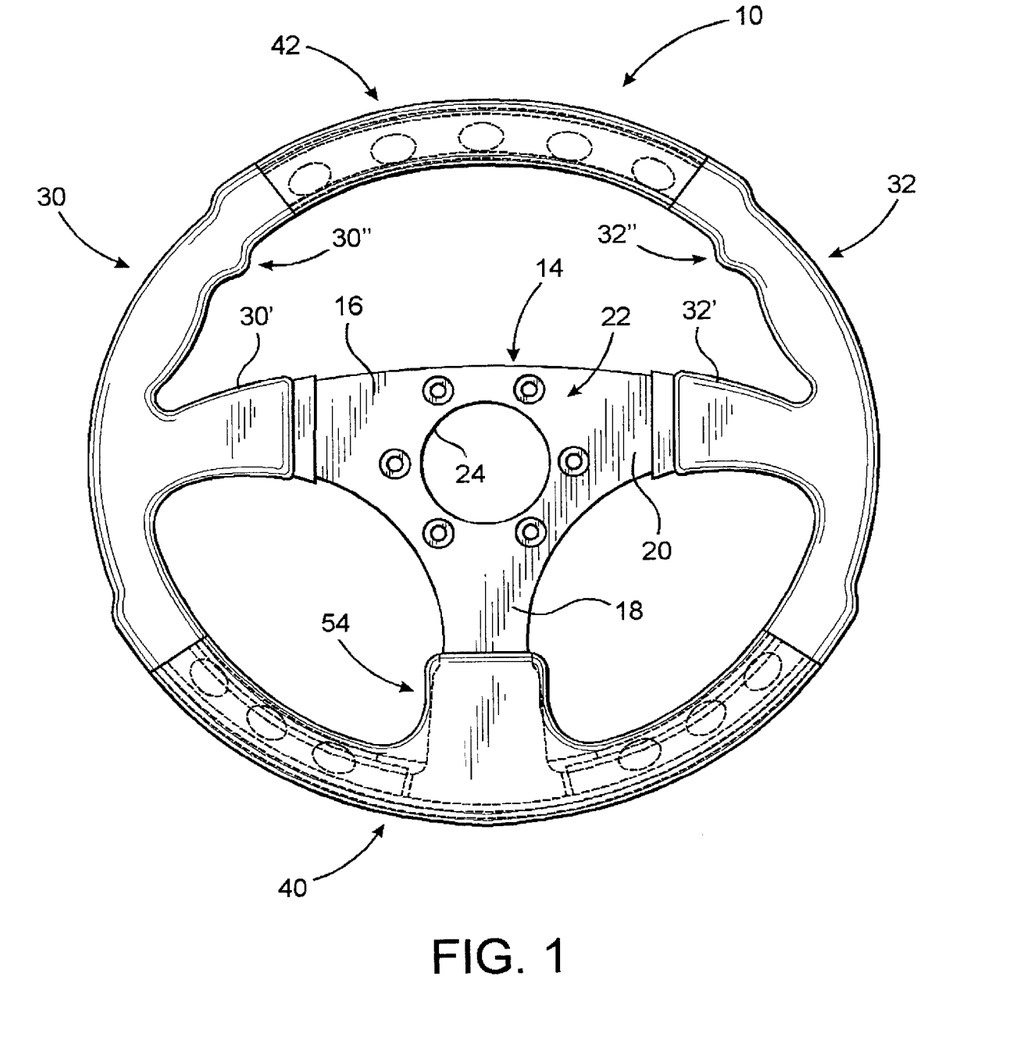
FIG. 1 is a front plan view of a steering wheel assembly of the present invention in assembled form.

As shown in the accompanying Figures, the present invention is directed towards an improved steering wheel assembly, which is generally indicated as 10 in FIG. 1, and further, which is represented in FIG. 1 in an assembled form but unattached to a steering column of a vehicle in which the steering wheel assembly 10 is intended to be mounted.

Figure 2:
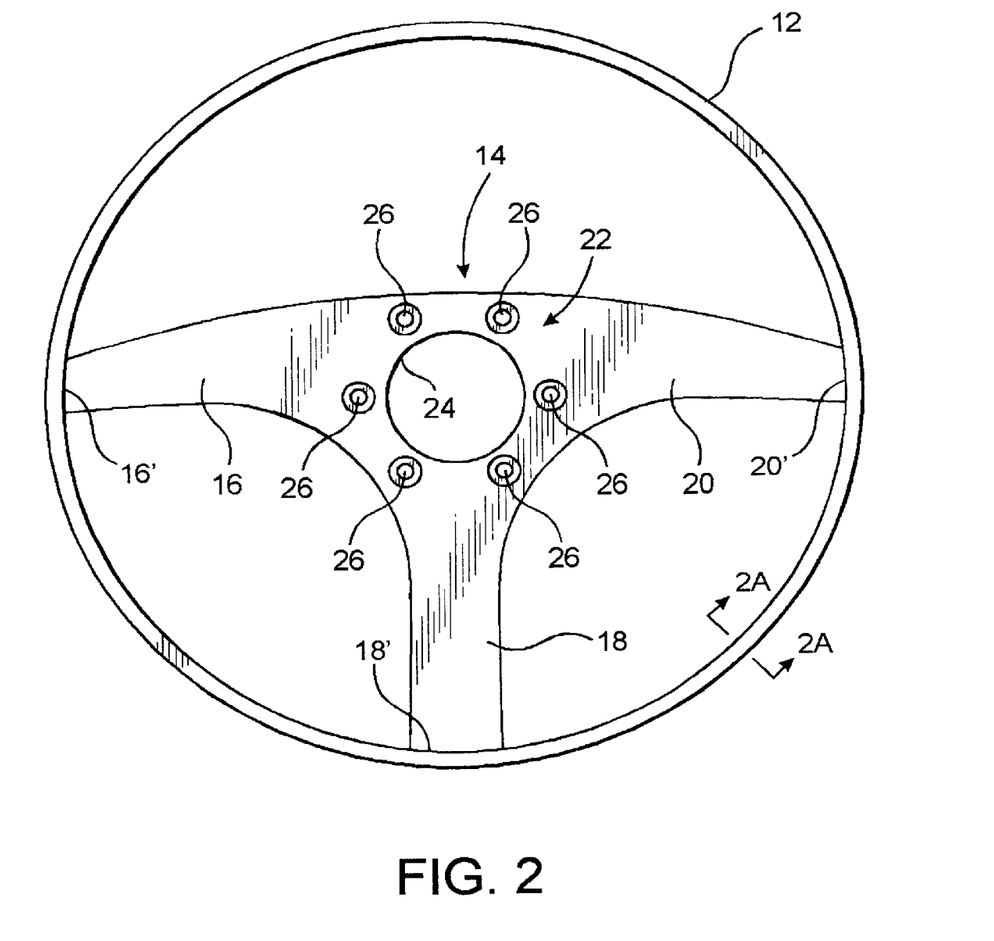
FIG. 2 is a front plan view of a support frame and accompanying spoke assembly of the embodiment of FIG. 1.
Figure 2A:
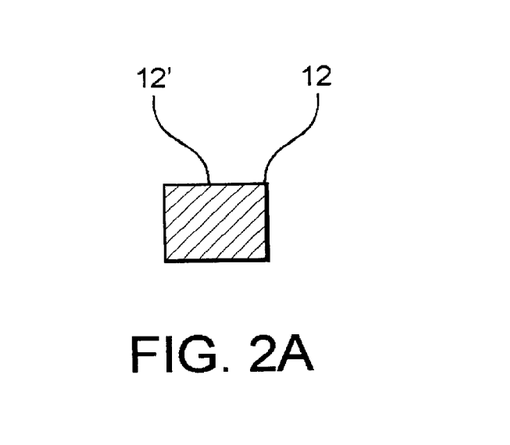
FIG. 2A is a sectional view taken along line 2A—2A of FIG. 2.

More specifically, and with reference to FIGS. 1 and 2, the steering wheel assembly 10 comprises a support frame 12 formed of a metallic or other high strength, relatively light weight material. The support frame 10 preferably has a generally U-shaped cross-sectional configuration, as shown in FIG. 2A, and is oriented in somewhat of an inverted disposition such that the outer portion of a base 12' of the support assembly 12 is readily connected to the spoke assembly, generally indicated as 14. As is perhaps best illustrated in FIG. 2, the spoke assembly 14 includes at least one, but preferably a plurality of spokes 16, 18 and 20 extending radially outward from an attachment portion, generally indicated as 22. The attachment portion 22 may include a central aperture, as at 24, for connection to and mounting on a correspondingly positioned portion of a steering column of a vehicle with which the steering wheel assembly 10 is associated. The attachment portion 22 may also include a plurality of spaced apart apertures 26 designed to receive an equivalent number of connectors or fastener devices for purposes of facilitating the fixed attachment of the spoke assembly 14 to the steering column of the vehicle. It should be apparent that the attachment portion 22 may take a variety of configurations dependent upon the structural configuration and intended method of attachment of the spoke assembly 14 to the steering column of a marine craft or other vehicle. The continuously configured support frame 12 is affixed preferably adjacent the outer most ends 16', 18' and 20' to the plurality of spokes 16, 18 and 20 by any applicable means of permanent attachment such as but not limited to rivets, welds, etc. The spoke assembly 14 may also be formed from a metallic or other high strength, relatively light weight material which will serve to establish a firm interconnection of the support frame 12 to the steering column of the vehicle.

With reference primarily to FIG. 1; the steering wheel assembly 10 of the present invention comprises outer, exposed portions or components defining the exterior of the steering wheel, which is intended to be gripped by the hands of the operator or passenger of the vehicle on which the steering wheel assembly 10 is mounted. Such exterior components may include one or more gripping portions 30 and 32. In the preferred embodiment of FIG. 1, the gripping portions 30 and 32 are disposed in spaced apart, substantially opposing relation to one another and are affixed to spaced apart lengths of the support frame 12 in overlying, covering and surrounding relation thereto. In addition, each of the gripping portions 30 and 32 may include a spoke stub 30' and 32' which would preferably be integrally formed on the remainder of the gripping portions 30 and 32 and which extend radially inward towards the attachment portion 22 and in overlying, covering and surrounding relation to the ends 16' and 20' as well as an adjacent portion of the length of the spoke 16 and 20, as is clearly evident from a review of both FIGS. 1 and 2. Each of the gripping portions 30 and 32, including the spoke stubs 30' and 32' are preferably permanently affixed to the support frame along the aforementioned respective lengths thereof by molding and/or tightly wrapping thereabout a relatively soft and at least minimally compressible material, such as but not limited, to leather, an impregnated cloth material, a plastic wrap, etc. Such materials may be subjected to the application of heat and pressure so as to form them into a desired shape and configuration and, as set forth above, permanently affix them along the correspondingly disposed lengths of the side portions of the support frame 12 as shown. It should be noted that the shape of the gripping portions 30 and 32 may vary so as to include outer surface configurations generally indicated as 30" and 32" which are designed and structured to facilitate the gripping of the steering wheel assembly 10 by the hands of an operator or occupant of the vehicle. It is also to be emphasized that the number, dimension, configuration and location of the gripping portions 30 and/or 32 may vary and still be within the intended spirit and scope of the present invention.

Figure 3:
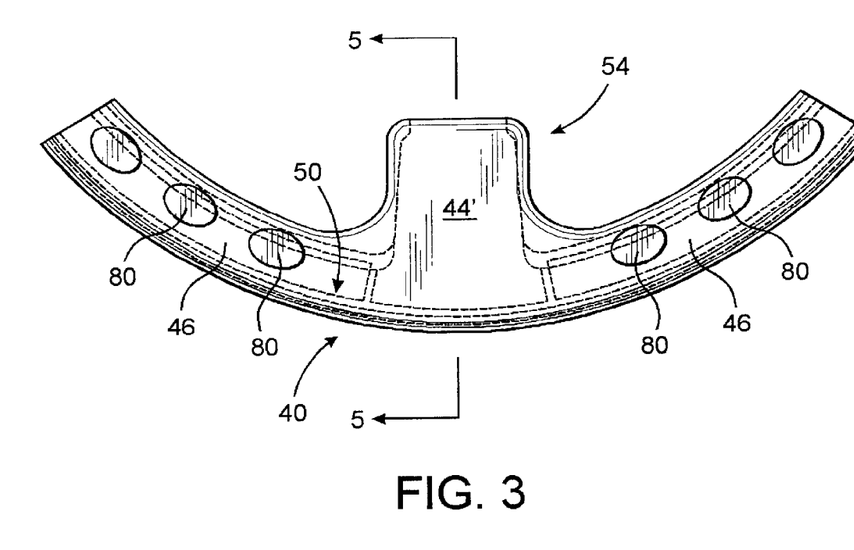
FIG. 3 is a rear detailed view of a component of the steering wheel assembly of the embodiment of FIG. 1.

With primary reference to FIGS. 1 and 3 thorough 7, one of the inventive features of the present invention is the provision of at least one, but preferably, a plurality of wheel sections. In the preferred embodiment of FIG. 1, the steering wheel assembly 10 of the present invention includes two spaced apart lower and upper wheel sections, respectively indicated as 40 and 42. It should be emphasized that the number of wheel sections may vary from one to more than two and may differ in both dimension and configuration from the wheel sections 40 and 42 represented in FIG. 1. Further, it is contemplated that the steering wheel assembly 10 may include one or more wheel sections of sufficient dimension and configuration to extend along the entire continuous length of the support frame 12 thereby eliminating the existence of and/or need for the gripping portions 30 and 32 and still fall within the intended spirit and scope of the present invention.

Figure 4:
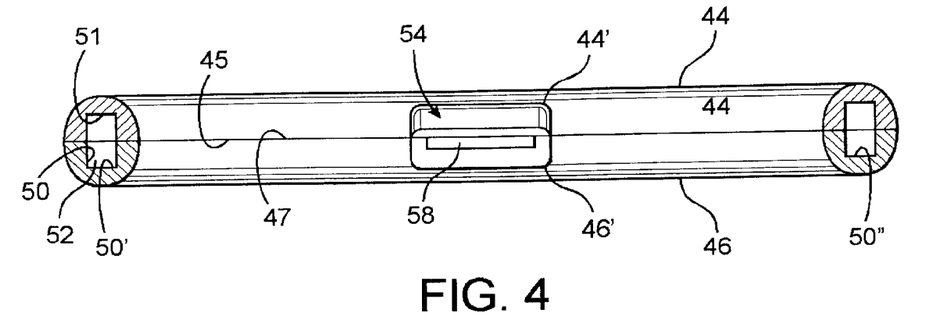
FIG. 4 is an end view of the embodiment of FIG. 3.
Figure 5:
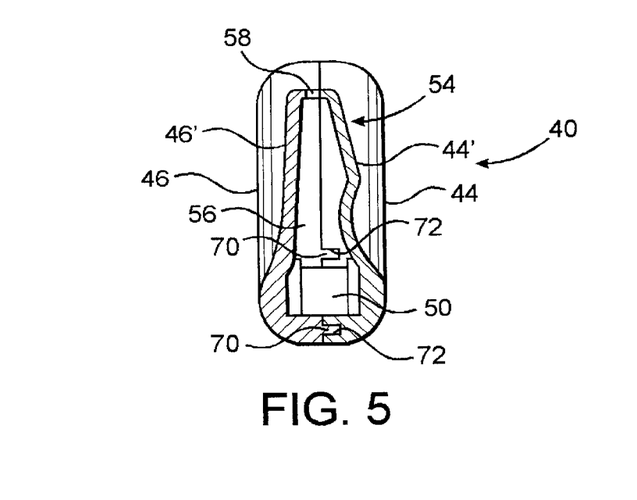
FIG. 5 is a sectional view taken along line 5—5 of FIG. 3.

Each of the lower and upper wheel section 40 and 42 preferably comprises two cooperatively structured segments. With reference to FIGS. 3 through 5, the lower wheel section 40 includes two segments 44 and 46 which are designed to be fixedly secured to one another and when so secured are mounted in supported relation about a corresponding length of the support frame 12. To this end, each of the two segments 44 and 46 include an interior surface, as at 45 and 47, which are disposed in confronting engagement with one another when the segments 44 and 46 are attached to one another, as best shown in FIG. 4. Further, each of the two segments 44 and 46 have an interior structure which, when joined together as shown in FIG. 4, form an interiorly disposed, substantially centrally located receiving channel generally indicated as 50 extending along the entire length or a substantial length of the wheel section 40. The receiving channel 50 is defined by channel portions 51 and 52 integrally formed on the interior of the two segments 44 and 46, respectively. When the segments 44 and 46 are joined together, the resulting receiving channel 50 is dimensioned, disposed and configured to receive a correspondingly disposed length of the support frame 12 therein. Further, the channel 50 has oppositely disposed open ends as at 50' and 50" through which the support frame 12 extends.

Other structural features of the lower wheel section 40 comprise an integrally formed spoke engaging portion or spoke stub, generally indicated as 54. The spoke engaging portion 54 is integrally formed, in part on each of the segments 44 and 46 by means of stub segments 44' and 46' directed radially inward and toward the attachment portion 22 of spoke assembly 14. When the segments 44 and 46 are joined or fixed together in surrounding relation to the support frame 12, the stub segments 44' and 46' are disposed in the assembled orientation best shown in FIG. 5 so as to form a hollow interior as at 56. As shown in FIG. 5, the hollow interior 56 communicates with an opening 58 formed in the outer most end of the spoke engaging portion 54. The hollow interior 56 and the opening 58 are specifically disposed, dimensioned and configured to receive the distal end 18' as well as a length adjacent thereto of the spoke 18 in the manner clearly shown in FIG. 1. It is emphasized that the location and dimension of the spoke engaging portion 54 is dependent on the corresponding dimension, configuration and location of the spoke 18 which it engages. With regard to the upper wheel section 42, the absence of a spoke in the vicinity of the wheel section 42, of course, eliminates the need of any type of spoke engaging portion.

Figure 6:
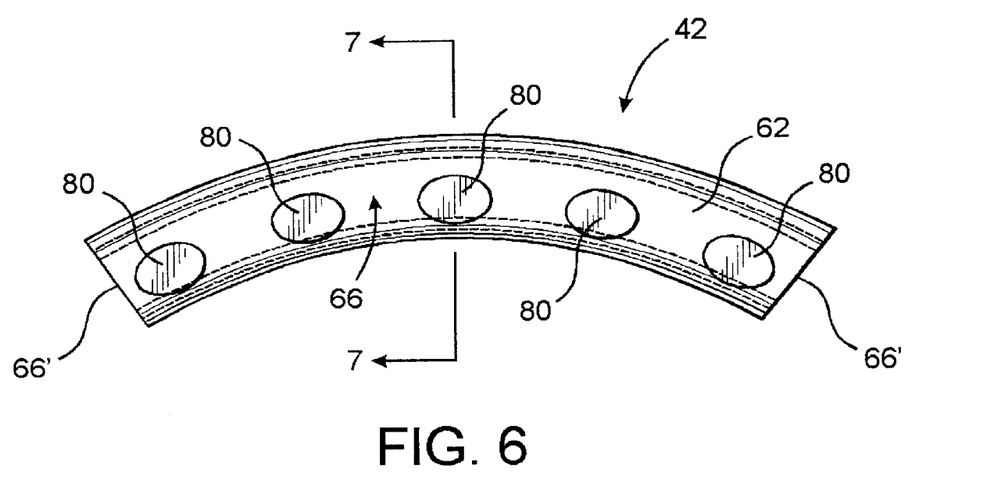
FIG. 6 is a rear plan view in detail of another component of the embodiment of FIG. 1.
Figure 7:
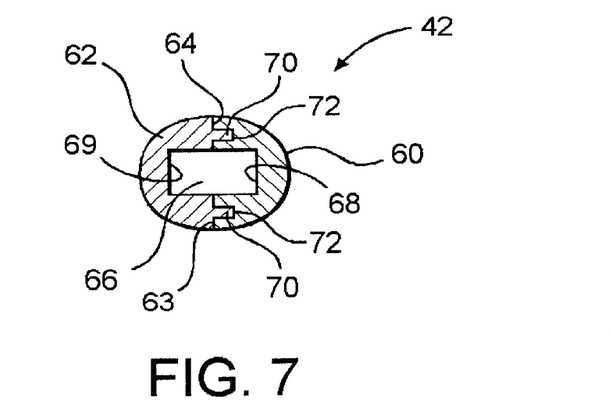
FIG. 7 is a sectional view taken along line 7—7 of FIG. 6.

With regard to the embodiment of FIGS. 6 and 7, the upper wheel section 42 also preferably comprises two segments 60 and 62, each having interior confronting surfaces 63 and 64 and an interior, substantially centrally disposed receiving channel 66 extending along the entire length thereof. The receiving channel 66 is at least partially defined by channel portions 68 and 69 integrally formed in the interior of the respective segments 60 and 62. As with the lower wheel section 40, the receiving channel 66 is disposed, dimensioned and configured to receive a corresponding length of the support frame 12 therein. When the segments 60 and 62 are attached to one another in the intended fashion as shown in FIG. 7, the upper wheel section 42 is mounted in supported, surrounding relation on the intended, corresponding length of the support frame as shown in FIG. 1.

As set forth above,when the respective segments 44 and 46 of the lower wheel section 40 and the two segments 60 and 62 of the upper wheel section 42 are joined together, the corresponding lengths of the support frame 12 are disposed within the respective receiving channels 50 and 66 so as to firmly and fixedly support the wheel sections 40 and 42 in there intended positions. An important structural feature of the present invention is the ability to readily attach the respective segments of each of the wheel sections 40 and 42 together subsequent to the formation of each of the segments independently of one another and of the other parts or components formed on and/or comprising steering wheel assembly 10 of the present invention. The manufacture, forming, and in particular, the surface finishing of the two segments of each of the one or more wheel sections adds to the versatility of the aesthetic appearance of the steering wheel assembly of the present invention, utilizing a variety of surface finishing techniques. Many of such surface finishing techniques would be difficult or impossible to implement on parts or components of the steering wheel assembly after they have been mounted on the support frame. Accordingly, in a most preferred embodiment of the present invention, the two segments 44 and 46 of the lower wheel section 40 and the two segments 60 and 62 of the upper wheel section 42 are intended to be fixedly secured to one another on the support frame 12 after they have been formed and finished. As best shown in FIGS. 5 and 7 the attachment of the corresponding segments to one another is preferably accomplished by means of a "snap-fit" attachment. Such snap-fit attachment is more preferably defined by a tongue and groove structure comprising at least one, but preferably, two spaced apart tongues and grooves formed on the segments 44, 46 and 60, 62 of the respective wheel sections 40 and 42. More specifically, and with reference to the aforementioned Figures, one of each of the two segments defining a wheel section 40 or 42 includes two, spaced apart substantially parallel elongated, integrally formed tongues 70 disposed on opposite sides of the respective receiving channels 50 and 66. Similarly, the other of the two segments of each of the wheel sections 40 and 42 have elongated, integrally formed grooves 72 extending inwardly from the respective interior surfaces and are correspondingly dimensioned, configured and disposed to receive one of the tongues 70 therein. The plurality of tongues 70 and the plurality of correspondingly positioned grooves 72 define the aforementioned snap-fit connection which allows the attachment of the two segments 44, 46 and 60, 62 of the lower and upper wheel sections 40 and 42 respectively. Such attachment may be accomplished without the need or requirement of specialized or conventional tooling and such assembly may be accomplished by relatively unskilled labor. More importantly such assembly or attachment of the wheel sections 40 and 42 in the manner described, subsequent to the manufacture, formation and surface finishing of each of the segments, allows for greater versatility in the appearance of the sections 40 and 42 as well as the entire steering wheel assembly 10 of the present invention.

Yet another inventive structural feature of the present invention is the provision of a plurality of depressions 80 formed in at least one but preferably both of the lower and upper wheel sections 40 and 42. As shown best in FIGS. 3 and 6, the depressions 80 are disposed in spaced relation to one another preferably in the undermost segments 46 and 62 of the respective wheel sections 40 and 42. Such depressions 80 may vary in number but are preferably disposed, dimensioned and configured to facilitate receipt of the fingers of the driver or occupant of the vehicle therein.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,
What is claimed is:

1. A steering wheel assembly designed for use on any one of a variety of different vehicles, said assembly comprising:
   a) a spoke assembly including an attachment portion structured to be secured to a steering column and a plurality of spokes extending radially outward from said attachment portion,
   b) a support frame attached to said plurality spokes substantially at an outer end thereof,
   c) at least one wheel section having an elongated configuration and structured to define an exposed portion of a steering wheel, said one wheel section dimensioned and configured to be maintained on and extend along a first length of said support frame,
   d) said one wheel section including two segments structured to be secured together in supported attachment on said support frame,
   e) said two segments cooperatively configured to define a receiving channel when secured together, said receiving channel disposed interiorly of said one wheel section and extending along the length thereof,
   f) said two segments cooperatively structured to define a substantially snap-fit connection therebetween, said snap-fit connection comprising a tongue and groove attachment structure formed and cooperatively disposed on interior confronting surfaces of said two segments,
   g) said tongue and groove attachment structure comprising two elongated tongues integrally formed on and extending along a length of said interior surface of one of said two segments and disposed on opposite sides of said receiving channel and two elongate grooves integrally formed on and extending along a length of said interior surface of the other of said two segments; said two tongues and said two grooves cooperatively disposed and structured for a fixed, mating engagement of said two segments, and
   h) a gripping portion fixedly secured to said support frame and configured to extend along at least a second length of said support frame.

2. An assembly as recited in claim 1 wherein said one wheel section is formed from a hard, substantially non-flexible material having a predetermined surface finish and said gripping portion is formed at least in part from a substantially soft, compressible material structured to facilitate gripping by the hands of a driver.

3. An assembly as recited in claim 1 wherein said receiving channel is dimensioned and configured to receive said first length of said support frame therein.

4. An assembly as recited in claim 3 wherein said receiving channel includes oppositely disposed open-ends each disposed in corresponding relation to an opposite end of said wheel section, said support frame extending within and along the entire length of said wheel section and outwardly from opposite ends of said wheel section.

5. An assembly as recited in claim 4 wherein said gripping portion is disposed contiguous to one end of said one wheel section and extends outwardly therefrom along said second length.

6. An assembly as recited in claim 1 wherein said two segments are disposed in substantially surrounding relation to said support frame along said first length thereof.

7. An assembly as recited in claim 6 wherein one of said two segments is disposed to define an outer exposed portion of the steering wheel and the other of said two segments is disposed to define an under exposed portion of the steering wheel.

8. An assembly as recited in claim 7 wherein at least one of said two segments comprises a plurality of finger depressions integrally formed in an outer surface thereof and disposed and configured to facilitate gripping thereof by a hand of the driver.

9. An assembly as recited in claim 1 wherein said one wheel section includes a spoke engaging portion extending radially outward from a remainder of said one wheel section and disposed and structured to engage and at least partially surround one of said plurality of spokes.

10. An assembly as recited in claim 1 wherein said support frame comprises a continuous, substantially annular configuration.

11. A steering wheel assembly comprising:
   a) a support frame comprising a continuous, substantially annular configuration, said support frame structured for interconnection to a steering column of a vehicle,
   b) at least one wheel section having an elongated, substantially curvilinear configuration and mounted on said support frame and extending along at least a first length thereof,
   c) said one wheel section comprising two segments cooperatively structured for fixed attachment with one another in surrounding supported relation along said first length of said support frame,
   d) said two segments cooperatively configured to define a receiving channel disposed interiorly of said one wheel section and extending along the length thereof;
   e) said receiving channel dimensioned and configured to receive said first length of said support frame therein and disposed to position said two segments substantially on opposite sides of said support frame,
   f) said two segments further comprising correspondingly disposed interior surfaces positioned in confronting relation to one another and cooperatively structured to define a substantially snap-fit connection for mating engagement of said two segments,
   g) said snap-fit connection comprising two elongate tongues integrally formed on and extending along the length of said interior surface of one of said two segments of said one wheel section,
   h) said snap-fit connection further comprising two elongate grooves integrally formed on and extending along the length of said -interior surface of the other of said two segments of said one wheel section, and
   i) said two tongues and said two grooves cooperatively disposed and structured for-fixed, mating engagement of said two segments of said one wheel section.

12. An assembly as in claim 11 further comprising a plurality of wheel sections each mounted on said support frame and extending along a length thereof in spaced relation to one another.

13. An assembly as recited in claim 12 wherein each of said plurality of wheel sections comprises two segments, said two segments of each of said plurality of wheel sections cooperatively structured for fixed attachment with one another in surrounding, supported relation along a length of said support frame.

14. An assembly as recited in claim 13 wherein said two segments of each of said plurality of wheel sections are cooperatively configured to define a receiving channel disposed interiorly of respective ones of said wheel sections and extending entirely along the, respective lengths thereof; said receiving channel disposed to position said two segments of each of said plurality of wheel sections on substantially opposite sides of said support frame.

15. An assembly as recited in claim 14 wherein said two segments of each of said plurality of wheel sections further comprise correspondingly disposed interior surfaces positioned in confronting relation to one another and cooperatively structured to define a substantially snap-fit connection for matting engagement of said two segments of each of said plurality of wheel sections.

16. An assembly as recited in claim 15 wherein said plurality of wheel sections comprise an upper wheel section and a lower wheel section respectively disposed on an upper half and a lower half of said support frame when the steering wheel is disposed in a neutral position.

17. An assembly as recited in claim 16 further comprising two gripping portions each fixedly secured to said support frame between said upper wheel section and said lower wheel section and in opposing relation to one another.

18. An assembly as recited in claim 16 wherein each of said wheel sections is formed from a hard, substantially non-flexible material and comprises a predetermined a exterior surface finish.

19. An assembly as recited in claim 16 wherein at least one of said upper or lower wheel sections comprises a spoke engaging portion extending radially outward from a remainder of said one wheel section and disposed and structured to engage and at least partially surround a spoke structured to interconnect said support frame to a steering column of a vehicle.

20. An assembly as recited in claim 19 wherein said spoke engaging portion is integrally connected at least in part to each of said two segments of said one wheel section.

21. An assembly as recited in claim 17 wherein said plurality of wheel sections comprise an upper section and a lower section respectively disposed on an upper half and a lower half of said support frame when the steering wheel assembly is disposed in a neutral position.

22. An assembly as recited in claim 21 wherein said tongue and groove attachment structure comprises two elongate tongues integrally formed on and extending along the length of said interior surface of one of said two segments of each of said upper and lower wheel sections and disposed on opposite sides of said receiving channel; said tongue and groove attachment structure further comprising two elongate grooves integrally formed on and extending along the length of said interior surface of the other of said two segments of each of said upper and lower wheel sections; said two tongues and said two grooves cooperatively disposed and structured for fixed, mating engagement of said two segments of each of said upper and lower wheel sections.

* * * * *